P. M. KOENIG & J. R. MEYER.
BAIL HOLDER.
APPLICATION FILED MAY 21, 1908.
987,579.
Patented Mar. 21, 1911.
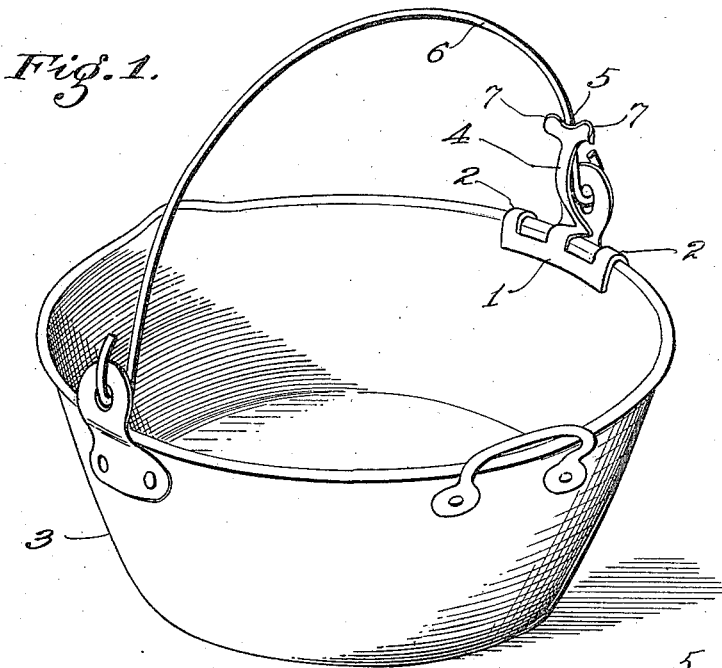
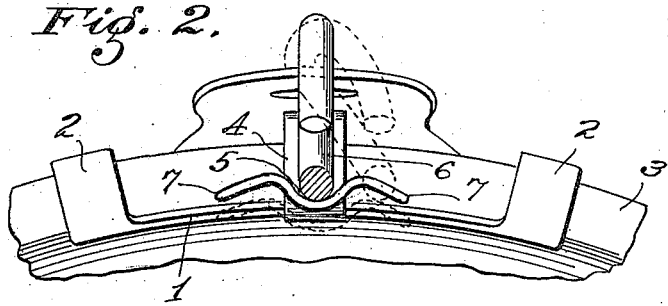
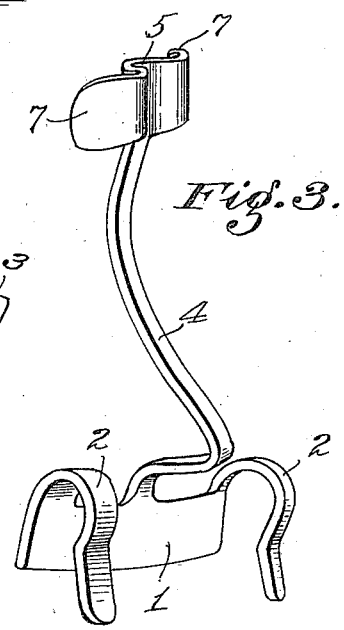
Witnesses
C. C. Holly
M. Beulah Townsend
Inventors
Paul Max Koenig
John R. Meyer.
by James R. Townsend
Their Atty.
THE NORRIS PETERS CO., WASHINGTON, D. C.

UNITED STATES PATENT OFFICE.

PAUL MAX KOENIG AND JOHN R. MEYER, OF LOS ANGELES, CALIFORNIA.

BAIL-HOLDER.

987,579.  Specification of Letters Patent.  Patented Mar. 21, 1911.

Application filed May 21, 1908. Serial No. 434,213.

*To all whom it may concern:*

Be it known that we, PAUL MAX KOENIG and JOHN R. MEYER, both citizens of the United States, residing at Los Angeles, in the county of Los Angeles and State of California, have invented a new and useful Bail-Holder, of which the following is a specification.

The object of this invention is to provide means independent of the manufacture thereof, whereby the bail of a pot, kettle, or other utensil may be held upright, thus to keep the same from being heated by contact with the vessel while the same is on the fire.

The invention may be constructed of either wire or sheet metal. In the accompanying drawings the same will be shown as it appears when constructed of sheet metal. The construction of the same from wire will be apparent to anyone skilled in the art of making bent-wire articles.

The accompanying drawings illustrate the invention.

Figure 1 is a perspective view of the bail-holder in use on a kettle. Fig. 2 is a view of said bail-holder on an enlarged scale, looking from above in Fig. 1, fragments of the bail and kettle being shown. Fig. 3 is a perspective view of the same.

1 is the base consisting of a bar provided at its ends with hooks 2 extending upwardly and bent outwardly and downwardly, said base being adapted to fit inside the kettle 3 with the hooks hooked over the kettle-rim. 4 is a standard extending upwardly from said bar between the hooks, and provided in its outer face above the level of said hooks with a retaining recess 5 to receive the bail 6 of the kettle. On each side of said retaining recess 5 are provided bail guides in the form of lips 7 bent inwardly away from the retaining recess so that when the bail is lifted from the rim of the kettle into position to lift or suspend the kettle, said bail will engage one of said bail guides, thereby forcing the upper end of the standard inwardly until the bail seats in the retaining recess. Thereupon the standard will support the bail in its upright position. The standard is bent over and back to yieldingly engage the inner face of the ear so as to hold the holder in place upon the kettle when the bail is out of engagement with the holder.

The standard is made resilient and is constructed to stand normally in bail-holding position, but may be sprung out of the way by the application of a comparatively small amount of force either to lower or to raise the bail. It is not necessary that the strength of the spring standard be very great for the reason that the bail stands in vertical position when held by the holder, and has but slight tendency to fall in either direction.

The manner of use will be understood from the foregoing.

The device may be sold to the trade independently of any vessel and may be seated on any vessel to which it is adapted and may be readily removed to facilitate cleaning or for the purpose of being transferred from vessel to vessel as may be desired.

It will be readily seen that our device is not a part of the manufacture of a kettle or similar utensil having a bail to be screwed, bolted, soldered, riveted, or otherwise permanently attached to said utensil as a part thereof, or to be permanently secured thereto after manufacturing, but is specifically an article of independent manufacture to be applied to a utensil in use, attachable and detachable by simple pressure without the use of bolts, screws, rivets, solder, or other permanent securing means. It is attached by pressing the hooks 2 down over the rim of the utensil each side of the bail ear when the bend in the lower part of its standard 4 engages the ear by pressure thereagainst, holding the device securely in place while the upper end of the standard is held in position to resiliently engage and hold the bail when it is brought into a vertical position. The device is thus independent, self-attachable, self-adjustable, and automatic in its action.

We claim:—

1. A bail-holder in one piece, self-attachable and self-adjustable, comprising a bar, hooks extending upwardly from the ends of the bar and bent outwardly and downwardly and inwardly and outwardly at the ends thereof, a standard extending upwardly from the center of the bar and having a retaining recess in its upper end on the outer face thereof, and a guide at one side of the recess.

2. A bail-holder in one piece, self-attachable and self adjustable, comprising a bar, hooks extending upwardly from the ends of the bar and bent outwardly and downwardly and inwardly and outwardly at the ends thereof, a standard extending upwardly from the center of the bar and having a retaining recess in its upper end on the outer face thereof, and guides at the sides of the recess.

3. A bail-holder comprising a bar, hooks extending upwardly from the ends of the bar then outwardly and downwardly, a standard extending upwardly from the center of the bar, said standard being bent over and back and said standard having a retaining recess at its upper end, the hooks being adapted to engage the rim of a kettle or the like and the bent-over portion of the standard being adapted to yieldingly engage the inner face of the ear of the kettle or the like so as to secure the holder in place.

4. The one-piece, self-adjustable and detachable device set forth for use on a kettle having a bail, said device comprising a bail holder composed of sheet metal and having a base bar provided with hooks to hook upon the rim of the kettle, a spring standard projecting upwardly from the bar intermediate the hooks, and provided at its upper end with a recess and on each side of the recess with lips to receive the kettle bail, said lips thereof being outwardly and backwardly turned and adapted to guide the bail into said recess.

In testimony whereof, we have hereunto set our hands at Los Angeles, California, this 14th day of May, 1908.

PAUL MAX KOENIG.
J. R. MEYER.

In presence of—
 JAMES R. TOWNSEND,
 M. BEULAH TOWNSEND.

Copies of this patent may be obtained for five cents each, by addressing the "Commissioner of Patents, Washington, D. C."